United States Patent Office 3,565,788
Patented Feb. 23, 1971

3,565,788
HYDROCARBON CONVERSION WITH CLINOPTILOLITE CATALYSTS
Walter D. Foucher, Jr., and Robert M. Suggitt, Wappingers Falls, and Eugene E. Sensel, Beacon, N.Y., assignors to Texaco Inc., New York, N.Y., a corporation of Delaware
No Drawing. Filed June 27, 1968, Ser. No. 740,465
Int. Cl. C10g *13/02*
U.S. Cl. 208—111         5 Claims

ABSTRACT OF THE DISCLOSURE

Clinoptilolite, a natural zeolite, after being subjected to acid leaching, possesses catalytic properties for hydrocarbon conversion. In particular, this catalyst when combined with a Group VIII and/or Group VI–B metal is useful as a hydrodewaxing catalyst for processing waxy hydrocarbon distillates.

BACKGROUND OF THE INVENTION

This invention relates to hydrocarbon conversion processes employing a clinoptilolite catalyst. In one of its more specific aspects, the present invention relates to an acid treated clinoptilolite zeolite having catalytic properties. This invention is particularly related to the selective elimination of wax-like materials from fuel oil distillates and lubricating oil base stocks by the catalytic activity of a decationized clinoptilolite to which has been added a metal having hydrogenation catalytic activity.

It has been proposed heretofore to contact petroleum fractions with molecular sieves, i.e., zeolites capable of preferentially absorbing one hydrocarbon type, for example, straight chain normal paraffins or aromatic hydrocarbons, from a mixture containing several hydrocarbon types. In particular, molecular sieves having mean pore diameters of about 5 A. have been used for selectively removing straight chain paraffins from hydrocarbon mixtures. It has also been proposed to contact petroleum hydrocarbons with a variety of natural and synthetic zeolites to effect catalytic conversion of the hydrocarbons. Zeolites of the faujasite class, particularly synthetic alumino-silicates known as zeolite X, and zeolite Y, as well as zeolite A, have been found to possess catalytic activity in a variety of petroleum hydrocarbon transformations including hydrogenation, dehydrogenation, cracking, oxidation, isomerization and alkylation.

More recently, it has been proposed to selectively eliminate wax-like materials from petroleum distillates in hydroconversion processes employing mordenite-type zeolites.

Clinoptilolite is a natural zeolite related to heulandite. It is particularly rich in silica. Barrer and Makki found that by treating this zeolite with mineral acid of different strengths, the original cations were replaced with hydronium ions and aluminum was progressively removed to produce a porous, largely crystalline molecular sieve sorbent.

To date, there has been no reported evidence that acid treated clinoptilolite possesses catalytic activity.

SUMMARY OF THE INVENTION

We have found that a clinoptilolite zeolite which has been subjected to acid treatment which substantially decreases the alkali metal and alkaline earth metal cation content, significantly reduces the alumina and soda contents and substantially increases the surface area, has enhanced catalytic activity for the conversion of hydrocarbons. Further we have found that by incorporating a Group VIII and/or Group VI–B metal with an acid treated clinoptilolite, a catalyst is produced which is particularly useful for the selective hydrodewaxing of wax-containing petroleum charge stocks.

Clinoptilolite in its natural form is not effective for hydrocarbon conversion regardless of whether the temperature is within the range usually employed to effect such conversions and regardless of catalyst additions. Clinoptilolite is a silica-rich zeolite related to heulandite and is one of the most siliceous aluminosilicates, having a silica to alumina mole ratio greater than about 10. Clinoptilolite belongs generally to the class of crystalline zeoites which have as their fundamental structure entity the (Al, Si)$O_4$ tetrahedron. Each tetrahedron is joined to four like tetrahedra through the shared oxygen atoms at its apices. In zeolites, these three dimentional structures are not impaired by removal of the water of hydration from the molecule.

Structurally, clinoptilolite is significantly distinguishable from other zeolites. Clinoptilolite contains systems of essentially independent parallel channels, whereas other zeolites such as the faujasites and similar synthetic zeolites have three dimensional crystalline cage structures having four to six windows or pore openings per unit cell through which access may be had to the inner cavity or unit cell of the zeolite molecular sieve. Although natural mordenite also contains parallel channels, they are circumscribed by tweve membered rings. Clinoptilolite has a similar channel-type structure composed of octagonal channels surrounded by smaller pentagonal channels.

Acid treating of the clinoptilolite to enhance its catalytic activity may be achieved with highly ionic inorganic and organic acids, such as hydrochloric acid, sulfuric acid, hydrobromic acid and trifluoracetic acid. The treatment may be performed with an acid having a normality between about 0.05 and about 8 by refluxing a mixture of the clinoptilolite and acid for periods of up to 16 hours. Following the acid treatment the clinoptilolite is washed with distilled water to remove traces of entrained acid, dried and calcined before use. In some instances it may be desirable to repeat the acid treatment of the aluminosilicate. If metals are to be combined with the clinoptilolite, they are added by techniques well known in the art subsequent to the acid treating.

The acid treatment reduces the alumina and soda ($Na_2O$) contents while increasing the surface area of the clinoptilolite. The acid treatment should not be so severe as to impair or destroy the crystalline integrity of the clinoptilolite. Further, it has been found that optimum catalytic activity is achieved long before the severity of the acid treatment impairs the crystallinity of the clinoptilolite.

DESCRIPTION OF THE PREFERRED EMBODIMENTS

In accordance with the present invention, a petroleum fraction containing wax-like hydrocarbons is contacted with an acid activated clinoptilolite impregnated with a Group VIII and/or Group VI–B metal at a temperature effective for conversion of at least part of the higher melting point, wax-like hydrocarbons to non-waxy products. Usually, the wax-like hydrocarbons are in admixture with non-waxy hydrocarbons and usually mixed also with hydrocarbons of other types, for example, napthenes, aromatics, olefins or asphaltic materials.

In a preferred method of operation, hydrocarbon feed stocks containing wax-like hydrocarbons are passed, in the presence of hydrogen, into contact with acid activated clinoptilolite impregnated with a Group VI–B and/or a Group VIII metal, particularly a platinum group metal.

In another method of operation, acid treated clinoptilolite without the addition of metal catalysts may effectively be employed as a hydrocarbon conversion catalyst. For example, clinoptilolite having catalytic properties may be employed for such processes as catalytic cracking and isomerization of hydrocarbons.

Acid treating of the clinoptilolite may be suitably effected with acids, such as hydrochloric, sulfuric, hydrobromic, or trifluoroacetic, in a manner which will selectively remove alumina without destroying the zeolite crystalline structure. Refluxing dilute hydrochloric acid is an extremely effective way of improving the catalytic properties of clinoptilolite. Following the acid treatment, the clinoptilolite is water washed to remove evidence of entrained acid and then calcined, with or without catalytic metal additions, in air at elevated temperatures up to about 1000° F. In general, we have found that the catalytic activity of the clinoptilolite increases as the severity of the acid treatment increases but that an optimum is reached beyond which catalytic activity declines until at some point the treatment is so severe as to destroy the crystalline structure of the zeolite. During the acid treatment the alumina and $Na_2O$ contents are gradually decreased while the surface area of the zeolite increases to an optimum and then slowly decreases. The acid treatment should be performed to achieve an $Al_2O_3$ concentration of between about 1.5 and about 6.5 wt. percent, an $Na_2O$ content of between about 0.01 and about 1.0 wt. percent and a surface area of between about 100 and about 400 m.$^2$/gram, preferably greater than about 200 m.$^2$/gram.

We have found that a clinoptilolite having the above properties may be obtained by acid treating crushed clinoptilolite of 10–25 mesh with hydrochloric acid having a normality of about 0.05 to about 8.0, preferably about 2.0 to about 4.0 under reflux conditions for about 4 to 16 hours. In some instances following water washing the acid treatment may be repeated.

For those reactions wherein hydrogenation components must be combined with the clinoptilolite, the catalytic metal may be incorporated in or on the zeolitic base either by ion exchange or impregnation techniques well known in the art of catalyst manufacture. Group VIII metals, particularly iron, cobalt, nickel, palladium, platinum, rhodium, iridium and ruthenium have been found especially useful catalytic additions to acid activated clinoptilolite with the Group VIII metals of Period 5 and 6 being particularly preferred. In addition, it may be desirable to combine the Group VIII metals with the Group VI-B metals, such as molybdenum and tungsten. In particular, such combinations as cobalt and molybdenum, nickel and molybdenum, nickel and tungsten and cobalt and tungsten may desirably be incorporated with the acid activated clinoptilolite. Additions of Group VIII metals of Period 5 and 6 should constitute between about 0.01 and 5 wt. percent of the catalyst, preferably between about 0.5 and 2.0 wt. percent, whereas the other Group VIII metals, such as cobalt and nickel should comprise between about 3 and 10 wt. percent, preferably between about 4 and 6 wt. percent. Group VI-B metals, such as molybdenum and tungsten, should constitute between about 3 and 20 wt. percent, preferably between about 10 and 15 wt. percent.

Acid activated clinoptilolite having an $Al_2O_3$ content of between about 3 and about 5 wt. percent, an $Na_2O$ content of less than about 0.5 wt. percent and a surface area of between about 200 and about 300 m.$^2$/gram and having incorporated thereon 0.5 to 2.0 wt. percent palladium or platinum has proved to be a very active and rugged catalyst for the selective hydrodewaxing of waxy hydrocarbon feed stocks.

In general, preferred operating conditions for hydrodewaxing as practiced by our invention of high melting point hydrocarbons to lower molecular weight lower boiling hydrocarbons in the presence of acid activated clinoptilolite are: hydrogen feed rates in the range of 100–20,000 s.c.f./bbl., preferably 500–10,000 s.c.f./bbl.; space velocities in the range of about 0.1 to 10 liquid volumes per hour per volume of catalyst, preferably 0.25 to 5.0 LHVS; temperatures in the range of about 400–900° F., preferably 500–850° F. and pressures within the range of atmospheric to 5000 p.s.i.g., preferably in the range of 200 to 1500 p.s.i.g.

The useful feed stocks which may be dewaxed by the process of our invention are hydrocarbon feed stocks containing wax-like hydrocarbons, for example, lubricating oil distillates, middle distillates and fuel oil distillates. Thus the process of our invention may be utilized to process distillates to produce such products as low pour point lubricating oils, low pour point fuel oils, low pour point diesel fuel oils and low haze refrigerator oils.

As used herein, the terms "wax," "waxy" and "wax-like" have their usual meanings in the art, i.e., those high melting point hydrocarbons which can be removed from hydrocarbon mixtures by solvent dewaxing procedures involving dilution and chilling of the mixture, followed by removal of solidified hydrocarbons from the solution. The wax content of hydrocarbon mixtures can be effectively reduced by employing the process of our invention.

Acid activated clinoptilolite may also be effectively used as a hydrocarbon conversion catalyst without the incorporation thereon of catalyst metals. Clinoptilolite having $Al_2O_3$ and $Na_2O$ contents and a surface area which is effective for dewaxing may also be effectively used for hydrocarbon conversion, in general, and catalytic cracking and isomerization, in particular.

The following examples illustrate the practice and advantages of our invention.

Example I

Sample No. 1 of crude clinoptilolite, having the properties listed in Table I below, was crushed and sieved. 10 grams of the 10–25 mesh material were placed in each of 10–250 ml. Erlenmeyer flasks. 150 ml. of hydrochloric acid of varying concentrations were added to each sample and a water cooled condenser placed in the neck of each flask. The acid had a normality ranging from 0.65 to 7.17 as shown in Table II, below. The flasks were then placed in a 100° C. constant temperature bath for four hours, after which the acid treated clinoptilolite was washed with water until entrained acid was essentially removed. Each sample was then calcined at 1000° F. for one hour in a muffle furnace. The surface area and alumina content were determined for each sample.

TABLE I.—PROPERTIES OF CRUDE CLINOPTILOLITE

| | Sample No. 1 | Sample No. 2 |
| --- | --- | --- |
| Surface area, m.$^2$/g | 20 | 22 |
| $SiO_2/Al_2O_3$ mole ratio | 10.78 | 10.30 |
| Analysis, wt. percent: | | |
| $SiO_2$ | 62.9 | 65.0 |
| $Al_2O_3$ | 9.9 | 10.5 |
| $Na_2O$ | 7.2 | 3.8 |
| $Fe_2O_3$ | 0.83 | 1.68 |
| $CaO$ | 0.02 | 0.05 |
| Loss on ignition at 1,000° F. | 12.3 | 12.1 |
| Carbon | 0.09 | 0.18 |

The catalytic activity of each sample was determined by grinding the treated clinoptilolite to 30–80 mesh, admixing 0.4 ml. of catalyst with 3 ml. of sand and placing the mixture, as a fixed bed, in a microreactor. Prior to a run each sample was given an additional calcination at 1000° F. for 30 minutes with 30 ml. of air per minute passing through the bed. The activity of each catalyst sample was tested by measuring the cracking and isomerization of hexane, passing through the bed at a space velocity of 0.4 WHSV, a temperature of 650° F. and atmospheric pressure. The results of this series of runs are presented in Table II below.

TABLE II

| Acid normality | Surface area, m.²/g. | Al₂O₃, wt. percent | n-Hexane cracked, wt. percent | n-Hexane isomerized, wt. percent |
|---|---|---|---|---|
| 0.065 | 63 | 11.70 | 0.00 | 0.00 |
| 0.33 | 106 | 8.32 | 0.20 | 0.00 |
| 0.64 | 140 | 6.43 | 0.08 | 0.03 |
| 1.32 | 221 | 4.58 | 5.9 | 0.5 |
| 1.96 | 214 | 4.34 | 5.9 | 0.5 |
| 2.72 | 175 | 3.97 | 12.0 | 0.9 |
| 3.44 | 79 | 3.97 | 3.5 | 0.1 |
| 4.13 | 48 | 3.02 | 3.3 | 0.06 |
| 4.94 | 42 | 2.46 | 2.0 | 0.06 |
| 7.17 | 51 | 2.84 | 0.02 | 0.02 |

Example II

In a manner similar to that of Example I, Sample No. 2 of crude clinoptilolite, having the properties set forth in Table I, was ground and screened. Ten samples of 10 grams each of −25 mesh clinoptilolite were placed in 250 ml. flasks and treated with hydrochloric acid as in Example I. Following water washing and calcination, the surface area, alumina and Na₂O contents were determined and the activity of each sample measured in a microreactor in a fashion similar to that of Example I. The results are presented in Table III below.

TABLE III

| Acid normality | Surface area, m.²/g. | Al₂O₃, wt. percent | Na₂O, wt. percent | n-Hexane cracked, wt. percent | n-Hexane isomerized, wt. percent |
|---|---|---|---|---|---|
| 1.00 | 100 | 10.6 | 0.77 | 2.7 | 0.5 |
| 2.50 | 96 | 10.5 | 0.56 | 4.8 | 0.6 |
| 3.18 | 164 | 9.3 | 0.51 | 7.5 | 8.3 |
| 4.06 | 181 | 6.8 | 0.40 | 12.1 | 1.0 |
| 5.13 | 206 | 4.6 | 0.31 | 10.8 | 0.8 |
| 6.00 | 207 | 3.5 | 0.24 | 6.3 | 0.7 |
| 7.00 | 183 | 2.7 | 0.19 | 9.4 | 0.8 |
| 7.80 | 166 | 1.9 | 0.19 | 6.7 | 0.6 |
| 8.62 | 196 | 2.9 | 0.04 | 5.7 | 0.5 |
| 8.67 | 182 | 2.6 | 0.04 | 6.7 | 0.6 |

Example III

This example demonstrates the hydrodewaxing activity of the acid activated clinoptilolite.

600 grams of Sample No. 1 of crude clinoptilolite having a particle size of 10–25 mesh were treated with acid as in Example I by refluxing with 3 N HCl for 16 hours at 76° C. After washing the clinoptilolite with distilled water, it was then refluxed again with 3 N HCl for an additional four hours at 100° C. After being washed free of chloride and dried at 300° F. the acid treated clinoptilolite was calcined in a muffle furnace at 1000° F. for two hours. Adsorption measurements indicated a surface area of 276 m.²/g. Microreactor studies indicated that this material had a cracking activity for hexane of 18% and an isomeriztion activity of 2.0% at a 0.4 WHSV in hydrogen at atmospheric pressure and 650° F.

The clinoptilolite was impregnated with palladium chloride by adding 135 ml. of 3 N HCl containing 2.77 g. of PdCl₂ to 330 g. of calcined acid treated clinoptilolite and chilling the mixture in an ice bath for 45 min. The impregnated clinoptilolite was dried at 300° F. in glass trays and calcined at 500° F. for one hour and at 1000° F. for two hours. The impregnated acid treated clinoptilolite contained 0.48 wt. percent palladium.

The dewaxing activity of the metal impregnated clinotilolite was evaluated in two series of runs. In the first, a paraffin base distillate having a 50° F. pour point served as the charge stock. In the second a wax distillate having a 100° F. pour point wax employed. In each instance the runs were conducted in pilot plant equipment wherein the reactor vessel contained a fixed bed of 160 cc. of catalyst. The unit was operated in a concurrent downflow manner with a mixture of hydrogen and charge stock passing through the bed. The product liquid was stabilized in a separate batch stripping operation. The product pour point was determined to serve as a measure of the dewaxing ability of the catalyst. The operating conditions employed and the quality of the product are shown in Table IV below, for the paraffin base distillate, and in Table V below, for the wax distillate charge stock. The dewaxing activity of the clinoptilolite is apparent from the substantial reduction in pour point of both distillates.

TABLE IV

| Feed: | Paraffin base distillate |
|---|---|
| Pour point,° F. | 50 |
| Viscosity, SSU/100 | 68.8 |

| Catalyst age, hrs. | Pressure, p.s.i.g. | Temp., ° F. | LHSV | H₂, s.c.f./bbl. | Product pour point,° F. |
|---|---|---|---|---|---|
| 14 | 850 | 660 | 0.44 | 10,200 | −45 |
| 26 | 850 | 550 | 0.50 | 10,200 | 15 |
| 138 | 850 | 650 | 0.50 | 8,200 | −55 |
| 146 | 850 | 625 | 0.50 | 8,200 | −10 |

TABLE V

| Feed: | Wax distillate |
|---|---|
| Pour point,° F. | 100 |
| Viscosity, SSU/100 | 271 |

| Catalyst age, hrs. | Pressure, p.s.i.g. | Temp., ° F. | LHSV | H₂, s.c.f./bbl. | Product pour point,° F. |
|---|---|---|---|---|---|
| 38 | 850 | 650 | 0.53 | 7,400 | 15 |
| 62 | 850 | 700 | 0.05 | 8,800 | 5 |
| 90 | 850 | 750 | 1.5 | 7,800 | 20 |
| 106 | 850 | 800 | 2.0 | 8,200 | 10 |
| 114 | 850 | 775 | 1.05 | 8,500 | 5 |
| 126 | 850 | 750 | 0.49 | 8,100 | 5 |

The terms and expressions used herein are used as terms of description and not of limitation as there is no intention, in the use of such terms and expressions, of excluding any equivalents since it is recognized that various modifications and departures in the practice of the invention as shown above can be made within the scope of the invention claimed.

We claim:

1. A process for conversion of wax-like hydrocarbons which comprises contacting said hydrocarbons under wax conversion conditions and in the presence of hydrogen with clinoptilolite having a surface area between about 100 and 400 m.²/g., an Al₂O₃ content of between about 1.5 and 6.5 wt. percent and an Na₂O content of between about 0.01 and 1.0 wt. percent, said clinoptilolite having incorporated therewith a metal selected from the group consisting of Group VIII metals, Group VI–B metals and mixtures thereof, said wax conversion conditions comprising hydrogen in the range of 100–20,000 s.c.f./bbl. of oil, a space velocity of 0.1–10 LHSV, a temperature in the range of 400–900° F. and a pressure in the range of 0–5000 p.s.i.g.

2. A process according to claim 1 wherein said metal is selected from the group consisting of Period 5 and Period 6 Group VIII metals in an amount within the range of 0.1 to 5 wt. percent.

3. A process according to claim 1 wherein said wax-like hydrocarbons are present in a petroleum distillate selected from the group consisting of a lubricating oil base stock and a middle distillate and said conversion effects a reduction in pour point of said distillate.

4. A process for the selective conversion of wax-like hydrocarbons in a hydrocarbon oil which comprises contacting said oil in the presence of hydrogen with an acid-treated clinoptilolite having incorporated therewith a metal selected from the group consisting of Group VIII metals, Group VI–B metals and mixtures thereof under wax conversion conditions, said clinoptilolite having a surface area of between about 100 and about 400 m.²/g., an Al₂O₃ content of between about 1.5 and about 6.5 wt. percent and an Na₂O content of between about 0.01 and about 1.0 wt. percent and said wax conversion conditions comprising hydrogen in the range of 100–20,000 s.c.f./bbl. of oil, a space velocity of 0.1–10 LHSV, a temperature in the range of 400–900° F. and a pressure in the range of 0–5000 p.s.i.g.

5. A process according to claim 4 wherein the metal is palladium or platinum and comprises 0.5 to 2.0 wt. percent of said clinoptilolite, the surface area is between about 200 and about 300 m.²/g., the Al₂O₃ content is between about 3 and about 5 wt. percent and the Na₂O content is less than about 0.5 wt. percent.

References Cited
UNITED STATES PATENTS

| | | | |
|---|---|---|---|
| 3,367,884 | 2/1968 | Reid | 252—455 |
| 3,375,064 | 3/1968 | Miale et al. | 252—455 |
| 3,395,096 | 7/1968 | Gladrow et al. | 208—111 |
| 3,400,072 | 9/1968 | Tung et al. | 208—120 |
| 3,442,795 | 5/1968 | Kerr et al. | 208—120 |

DELBERT E. GANTZ, Primary Examiner

R. BRUSKIN, Assistant Examiner

U.S. Cl. X.R.

252—455